United States Patent [19]

Strait, Jr.

[11] Patent Number: 4,888,797
[45] Date of Patent: Dec. 19, 1989

[54] CIRCUIT PROTECTION DEVICE

[76] Inventor: Clifford C. Strait, Jr., 2810 E. Glencove, Mesa, Ariz. 85203

[21] Appl. No.: 109,501

[22] Filed: Oct. 16, 1987

[51] Int. Cl.$^4$ .................... H04M 1/00; H04M 5/01; H04M 5/10
[52] U.S. Cl. .................................. 379/438; 361/346; 379/164; 379/247; 379/263; 379/396; 379/397; 437/138; 437/142
[58] Field of Search ............... 379/438, 437, 247, 263, 379/396, 164, 397; 439/135, 136, 138, 142; 361/346

[56] References Cited

U.S. PATENT DOCUMENTS

| | | | |
|---|---|---|---|
| 2,559,151 | 7/1951 | Getzoff | 439/136 |
| 4,607,136 | 8/1986 | Thomas | 439/136 |
| 4,618,740 | 10/1986 | Ray et al. | 439/135 |
| 4,671,587 | 6/1987 | Lerner et al. | 439/135 |
| 4,711,634 | 12/1987 | Antone, II et al. | 439/136 |

FOREIGN PATENT DOCUMENTS 2117448 10/1971 Fed. Rep. of Germany ...... 436/142

Primary Examiner—Thomas W. Brown
Assistant Examiner—Danita R. Byrd
Attorney, Agent, or Firm—Cahill, Sutton & Thomas

[57] ABSTRACT

A detachably attachable protection device for use with a circuit routed to a DSX panel or the like in a telephone switching station includes a fixed plate having apertures for visual access to a light associated with the circuit, an aperture for access to a monitor jack and a pivotable plate connected to the fixed plate for selectively providing access to jacks for rerouting the circuit. The lift tab may be incorporated to assist in positioning the pivotable plate. In a variant protection device, a plurality of pivotable plates secured to a common fixed plate may be employed to individually protect all circuits routed to a DSX panel.

20 Claims, 2 Drawing Sheets

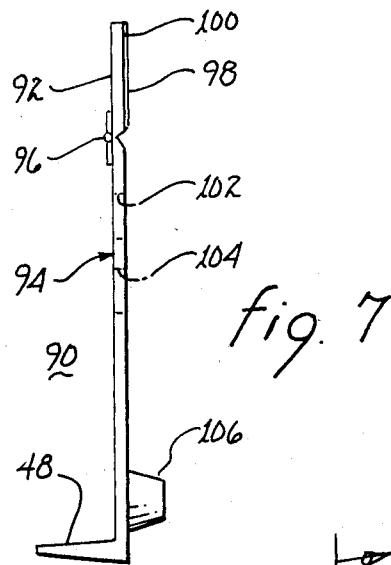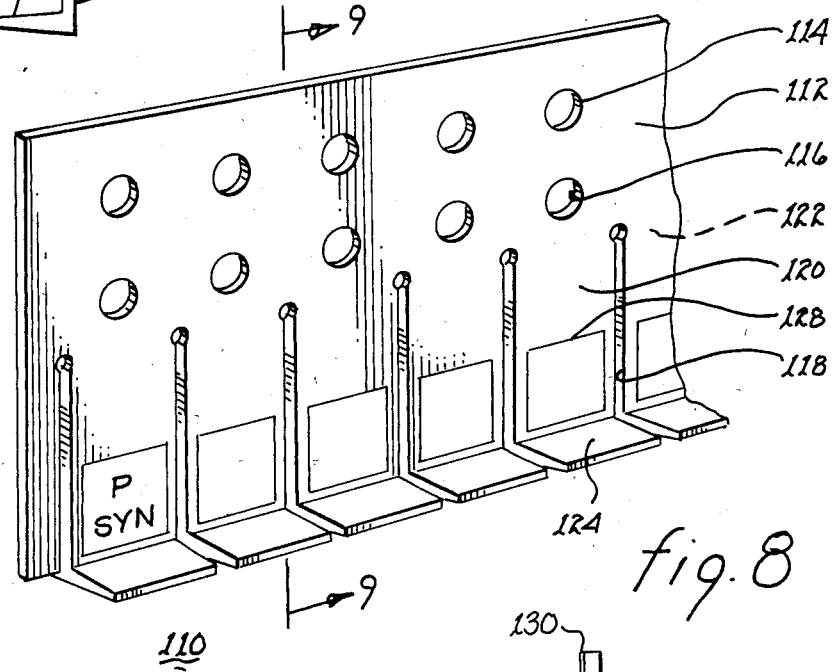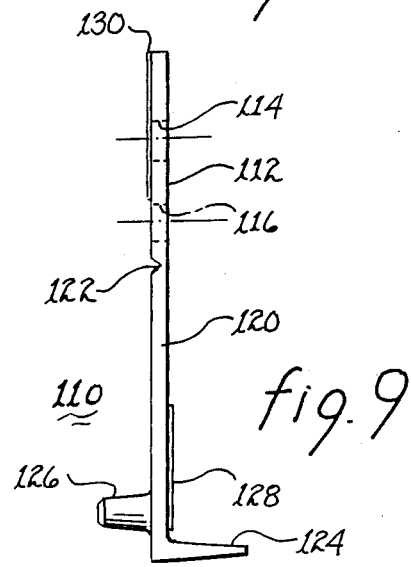

CIRCUIT PROTECTION DEVICE

BACKGROUND OF THE INVENTION

1. Field of the Invention

The present invention relates to telephone switching equipment and, more partiucularly, to equipment for protecting against inadvertent interruption of a circuit line at a telephone switching station.

2. Description of the Prior Art

In a telephone switching station, a plurality of panels (sometimes referred to as a DSX panel) are employed for providing access to each circuit routed through the station. Each such panel includes a status light, a monitor jack, a line out jack and a line in jack for each circuit routed to it. These components are vertically aligned in the panel. The light provides a visual indication of the status of the circuit. The monitor jack permits monitoring a transmission in progress on the circuit without interruption of the transmission. The line in jack and line out jack permit rerouting of the circuit and necessarily interrupt any transmission ongoing upon insertion of a plug into one of these two jacks.

Presently, computers and various other electronic signal handling devices communicate via telephone lines. An interruption during such transmission will usually garble the information transmitted and the informational content of the transmission will be lost with a potential serious detriment to the user. When only a telephone conversation is ongoing, the momentary interruption is usually, at worst, a minor irritation. Because of the potential consequences attendant loss of data as a result of an interruption, telephone maintenance and service personnel at telephone switching stations must be very careful not to cause an interruption of communications by inadvertent or mistaken insertion of a plug into a live out jack or live in jack. Despite careful attention, errors do occur and transmissions are lost during the normal course of performing maintenance and service functions.

To prevent access to a circuit at a DSX panel, a piece of tape or other barrier has been placed across the three jacks and light or at least the two critical jacks of a circuit in service. Such barrier would require removal thereof to perform maintenance or service functions upon the circuit. Once the barrier is removed, it may be inadvertently misplaced or simply not replaced due to forgetfulness. Further, if the light is covered, the informational content provided thereby is lost and if the monitor jack is covered, normal monitoring functions would require removal of the barrier.

SUMMARY OF THE INVENTION

The present invention is directed to a protection device usable at a DSX type panel for preventing inadvertent or mistaken line interruption of an active circuit while accommodating line monitoring and visual determination of the status of the line. A pivotable plate of the device requires positive manipulation to provide access before interruption of the line can be effected which positive act will reduce inadvertent interruption. The pivotable plate remains attached to the panel to preclude loss or misplacement.

It is therefore a primary object of the present invention to provide a protection device for preventing inadvertent interruption of a circuit routed to a DSX panel or the like.

Another object of the present invention is to provide a detachably attachable protection device for securing a circuit which is not to interrupted.

Yet another object of the present invention is to provide a protection device for accommodating visual review of the status of a circuit and monitoring of the circuit without interrupting the circuit.

Still another object of the present invention is to provide a protection device for simultaneously protecting each of a plurality of circuits against inadvertent interruption while accommodating access to any one of the protected circuits.

A further object of the present invention is to provide an inexpensive protection device for preventing interruption of a circuit routed to a DSX panel or the like.

A yet further object of the present invention is to provide a method for providing protected access to a circuit routed to a DSX panel.

A still further object of the present invention is to provide a method for accommodating non-invasive telephone line monitoring line functions while precluding interruption of a circuit routed to a DSX panel or the like.

These and other objects of the present invention will become apparent to those skilled in the art as the description thereof proceeds.

BRIEF DESCRIPTION OF THE DRAWINGS

The present invention will be described with greater specificity and clarity with reference to the followign figures, in which:

FIG. 7 illustrates an alternative means for attaching the present invention or the variant thereof;

FIG. 8 illustrates a functional variation of the present invention; and

FIG. 9 is a side view taken along lines 9—9, as shown in FIG. 8.

DESCRIPTION OF THE PREFERRED EMBODIMENT

Figure 1:
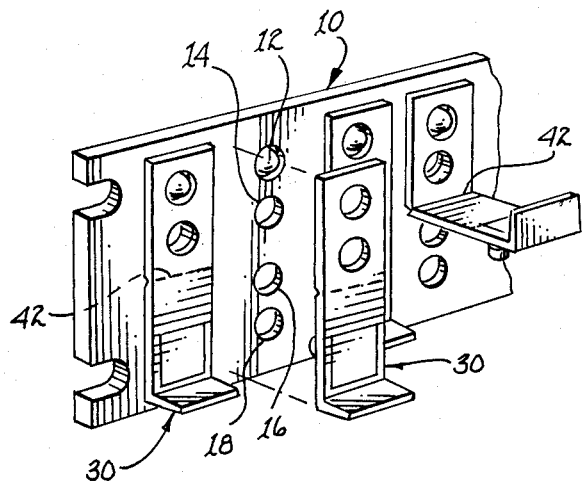
FIG. 1 illustrates a partial view of a conventional DSX panel used in many telephone switching stations having the present invention mounted thereon.
Figures 2, 3, 4:
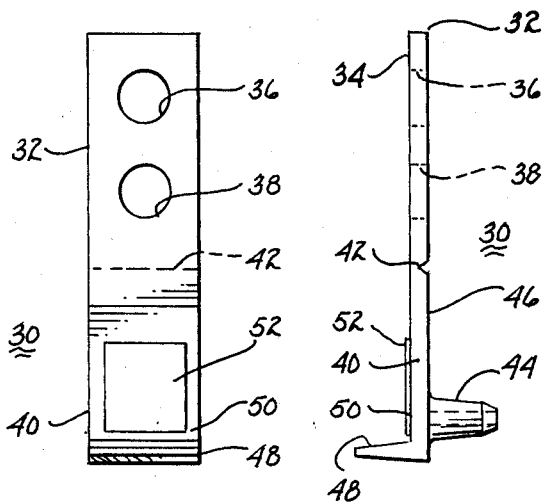
FIG. 2 is a front view of the present invention.
FIG. 3 is a side view of the present invention.
FIG. 4 is a rear view of the present invention.

A typical DSX panel 10 is illustrated in FIG. 1. Such panels are employed by the hundreds in a telephone switching station. Previously and presently widely used DSX panels have 25 to 50 circuits routed to each and each circuit may include 24 telephone lines. Recently developed variants of such panels are of smaller size in both width and length with 10 circuits routed thereto. Typically, for each circuit routed to a DSX panel or the like, four functions are available. A light 12 provides a visually perceivable indication of the status of the associated circuit. A monitor jack 14 permits, through insertion of a plug, monitoring of the communication being transmitted through a telephone line without interrupting the flow of communication or data. An output jack 16 and an input jack 18 accommodate, through insertion of plugs, rerouting of the circuit through or to other equipment; furthermore, signal generating and test equipment may be connected for testing and other purposes. Any insertion of a plug into either of jacks 16 or 18 usually results in interruption of the circuit. Variations in the size and/or configuration of the various jacks exist.

Presently, substantial data is transmitted through telephone lines between signal transmitting and signal receiving equipment. Moreover, emergency telephone systems, such as the 911 calls, include automated data transmissions. Generally, any interruption of a telephone line during transmission of data, will include either a loss of data or a garbling of subsequently transmitted data due to an out of syn condition between the source and recipient of the data transmission. Where a data loss occurs due to interruption of a 911 telephone call, substantial loss of property or loss of life may result. It is therefore evident that protection against inadvertent interruption of a circuit through insertion of a plug into either of jacks 16 or 18 must be guarded against.

This problem is not new and various crude solutions have been entertained and used. These solutions include the placing of adhesive tape across at least jacks 16 and 18 of critical circuits. Often, technicians may place the tape in a column across the light and monitor, output and input jacks of each circuit of critical interest. This latter procedure will preclude monitoring of the line through insertion of a plug in jack 14 and visually inspecting light 12. If access to jack 16 and 18 are needed, the tape is usually ripped off; after such removal, an operator may inadvertently or mistakenly place a plug in a jack adjacent to the circuit of interest. A less crude shield in the form of a strip of plastic, wood, cardboard, or the like has been taped across circuits which are critical. Again, protection is provided by such shields but problems may arise on removal of the shield.

Referring jointly to FIGS. 1, 2, 3 and 4, a protection device or protector 30 for use in conjunction with a circuit routed to a DSX panel 10, or the like, will be described in detail. The protector is configured in plan form to be superimposed upon the light and jacks associated with a circuit routed to a DSX panel or the like; in the presently known configurations of DSX type panels, these lights and jacks are vertically aligned. Furthermore, protector 30 is of a narrow enough width to permit the use of other protectors with adjacent circuits without creating functional interference therebetween, as illustrated in FIG. 1.

A first plate 32 is secured to a DSX panel 10, or the like, by a layer of adhesive 34. This adhesive may be of the type known as an acrylic film manufactured by the 3M Company, Product No. 950; which particular adhesive has a thickness of 5 mils. The first plate includes aperture 36 cooperates with light 12 on the DSX panel to accommodate continuous visual access to the light. A second aperture 38 is aligned with jack 14 to accommodate insertion of a plug into the monitoring jack. From the abvoe description, it becomes evident that first plate 32 is adhesively attached to the DSX panel about light 12 and jack 14 without impeding or interfering with access thereto by service or maintenance personnel.

A second plate 40 is pivotally attached to the first plate by a hinge 42. A dummy plug 44 of dielectric material extends from side 46 of the second plate for frictional engagement with one of jacks 16 or 18. In the presently considered preferred embodiment, dummy plug 44 is pentrably associated with jack 18. The dummy plug serves a function of maintaining second plate 40 adjacent to and parallel with the DSX panel. The second plate serves as a shield or guard to preclude access to either of output jack 16 or input jack 18 and thereby precludes inadvertent interruption of any ongoing transmission on the associated circuit.

Because access to output jack 16 and input jack 18 must be provided from time to time for service, maintenance or rerouting purposes, a pull tab 48 extends from side 50 of second plate 40. By pulling upon this tab, after installation of protector 30, the second plate will pivot about hinge 42 to disengage dummy plug 44 from the associated jack. Thereafter, access to either of the output or input jacks becomes available. Depending upon the nature of hinge 42, the second plate may tend to stay at or close to the position to which it was pivoted or it may tend to pivot downwardly in response to the force of gravity. After the work associated with either or both of the output and input jacks is completed, second plate 40 is manually pivoted downwardly to bring about engagement of dummy plug 44 with the associated jack to secure the second plate in a position adjacent the surface of the DSX panel.

From the above description several features of the present invention will be readily apparent. First, continous visual access to light 12 and physical access to monitor jack 14 is provided. Second, a deliberate physical manipulation must be performed to uncover the output and input jacks before interruption of the associated circuit can occur. Third, the output and input jacks are effectively electrically shielded when the second plate of protector 30 is in place. Fourth, uncovering of the output and input jacks will result in pivotal movement of the second plate which repositioning provides a clear indication to personnel of the identity of the circuit upon which work is being performed. Fifth, the protector will not be lost or misplaced during work performed on the associated circuit.

Figure 5:
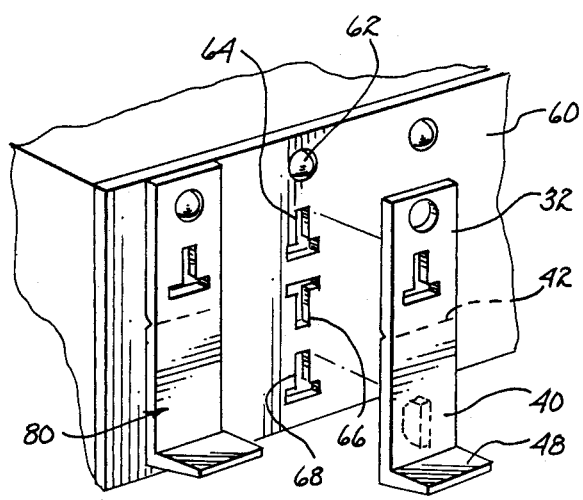
FIG. 5 illustrates a variant of a conventional DSX panel having a variant of the present invention mounted thereon.

By adding a label 52 to side 50, symbology or indicia identifying the particular circuit can be added. Moreover, such label can contain information vital to the circuit or work to be performed thereon. By having label 52 removable or the surface thereof erasable, the symbology or indicia can be changed at will. Referring to FIG. 5, there is illustrated a recently developed configuration for a panel 60 of the DSX type. For each circuit routed thereto, it includes a light 62, a monitor jack 64, an output jack 66 and an input jack 68. All three jacks, as illustrated, are T-shaped in cross section rather than the more widely used circular cross section jacks.

Figure 6:
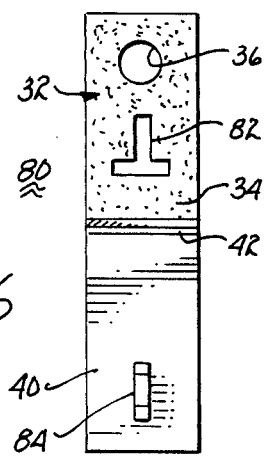
FIG. 6 is a rear view of the variant of the present invention.

Referring jointly to FIGS. 5 and 6, there is illustrated a protector 80 for use in conjunction with panel 60 to prevent inadvertent electrical contact with output jack 66 or input jack 68. Protector 80 is very similar to protector 30 illustrated in FIG. 1 and with respect to common features therebetween, similar reference numerals will be used. First plate 32 includes an aperture 36 for providing continuous visual access to light 62. Aperture 82 is T-shaped to accommodate a plug associated with monitor jack 64 in order to permit insertion of the plug into the jack without removal of protector 80. Second plate 40 is attached to the first plate through hinge 42. A tab 48 permits ready pivotal manipulation of the second plate about the hinge line. A dummy plug 84 is in the nature of a flange or tab configured to fictionally engage the base portion of T-shaped jack 68. Dummy plug 84 serves the same purpose of dummy plug 44 which is that of retaining second plate 40 adjacent panel 60 when the output and input jacks are to remain shielded. It also accommodates access to these jacks by readily disengaging and subsequently reengaging with jack 68.

In FIG. 7 there is illustrated a variant 90 of protector 80. In variant 90 hinge 42 has been eliminated. This variant includes a further plate 92 pivotally connected to the upper end of shield 94 through a hinge 96 to permit pivotal movement in one, the other or both directions; the direction of pivotal movement is a function of the location of the surface to which plate 92 is attached. Double stick foam tape or a layer of adhesive 98 secures side 100 of plate 92 to a horizonatal or other surface of panel 60. Variant 90 includes aperture 102 for maintaining visual access to light 62 and aperture 104 for maintaining continuous access to monitor jack 64. Dummy plug 106, which may be tab like in configuration, frictionally engages input jack 68 to retain protector 90 in place. A pull tab 48 is included to facilitate deliberate pivotal movement of the shield. It is to be understood that hinge 96 and plate 92 could be adapted for use with protector 30.

Referring to FIGS. 8 and 9, there is shown a protector 110 for use in conjunction with a full DSX type panel while still providing individual access to each line routed to the DSX type panel. The protector includes a first plate 112 having a plurality of apertures 114 sized and spaced to accommodate each of the lights associated with each telephone line at the DSX panel. A further plurality of apertures 116 are formed in first plate 112 to cooperate with and accommodate in configuration the monitor jacks of the associated DSX type panel. A plurality of slits 118 delineate adjacent parallel second plates 120 where each second plate shields an associated pair of output and input jacks corresponding with the vertically aligned ones of the light and monitor jack. Each of second plates 120 is pivotally connected to first plate 112 by a hinge 122, which hinge may be of the type illustrated in FIGS. 1, 2, 3 and 4. A pull tab 124, like pull tab 48, extends outwardly from each of the second plates to permit individual pivotal movement of the associated second plate. Each second plate 120 includes a dummy plug 126 for frictional engagement with one of the underlying output or input jacks of the associated DSX panel. A label 128 for having indicia placed thereupon to identify the underlying circuit may be incorporated in or affixed to one or more of second plates 120.

Protector 110 is particularly useful where most or all of the circuits associated with a DSX type panel must be protected against interruption. To accommodate such permanent or semi-permanent installation, protector 110 may be attached, via first plate 112, by a film of adhesive 130, as described above, or by more permanent attachment means, such as machine screws, rivets or the like.

The configuration of any one of protectors 30, 80, 90, 110 is readily formable from any one of many well known man made plastics by conventional well known techniques. Depending upon the plastic material selected, the hinge interconnecting the first and second plate of each protector may be of the type known in the plastics art as a living hinge. By using such a hinge, the complete protector can be manufactured as a one piece unit at substantial savings in manufacturing and assembly costs. Because most man made plastics suitable for fabrication of the protector are relatively inexpensive and as the manufacturing techniques permit mass production at a low per unit cost, every one of the protectors described above is relatively inexpensive to manufacture. This cost aspect becomes of substantial significance when one considers that at each telephone switching station, there may be hundreds or thousands of circuits with which a protector could and should be used. Thus, the costs for providing an essentially fool proof protection against inadvertent or mistaken interruption of a transmission is very low.

It is to be understood that the adhesive (34,130) associated with plates 32 and 112 could be replaced by a dummy plug extending from the plate into engagement with the monitor jack (38, 82, 116). In such event, plates 32 and 112 would be pivoted downwardly to permit and retain access to the monitor jack while the respective remaining plate 40, 120 would retain the protector (30, 80, 100) attached to the DSX type panel through its dummy plug. Moreover, in certain applications, plates 32 and 112 would be configured so as not to surround or otherwise be associated with the respective light of the DSX type panel.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A protection device for protecting a circuit against inadvertent and mistaken access to the output and input jacks in a DSX type panel to which the circuit is routed while accommodating visual access to a status light and access to a monitor jack, all pertaining to the same single circuit, said device comprising in combination:
    (a) a fixed plate, said fixed plate including means disposed in said fixed plate for accommodating visual access to the status light and access to the monitor jack;
    (b) a pivotable plate pivotable from a first position to a second position and return for shielding the output and input jacks when said pivotable plate is in the first position;
    (c) means for interconnecting said fixed plate and said pivotable plate; and
    (d) means for securing said fixed plate to the DSX panel to retain said protection device in place.

2. The device as set forth in claim 1 wherein said pivotable plate includes means for releasably retaining said pivotable plate in the first position.

3. The device as set forth in claim 2 wherein said retaining means includes a dummy plug for engaging at least one of the output and input jacks.

4. The device as set forth in claim 3 including a tab for manually pivoting said pivotable plate from the first position to the second position.

5. The device as set forth in claim 4 including means for adding indicia to said protection device.

6. The device as set forth in claim 4 wherein said protection device is a monolithic unit.

7. The device as set forth in claim 4 wherein said accommodating means comprises a pair of apertures.

8. The device as set forth in claim 3 wherein said accommodating means comprises a pair of apertures.

9. The device as set forth in claim 8 wherein said protection device is a monolithic unit.

10. A protection device for protecting the output jack and input jack of a circuit routed to a DSX type panel in a telephone switching station without impeding use of the status light and monitor jack associated with such circuit, said protection device comprising in combination:
(a) means for securing said protection device to the DSX panel;
(b) means associated with said securing means for selectively shielding the output jack and input jack of such circuit routed to the DSX panel, said shielding means being locatable in a first position generally parallel with and adjacent the plane of the DSX type panel for shielding the output jack and input jack of such circuit and in a second position displaced laterally out of the plane of the DSX type panel for unshielding the output jack and input jack of such circuit; and
(c) pivot means formed as part of said protective device but not connected to the panel wherein said pivot means pivots said shielding means relative to said securing means to relocate said shielding means in the first and second positions.

11. The device as set forth in claim 10 including means for individually manipulating each of said shielding means from the first position to the second position and return.

12. The device as set forth in claim 10 including means for releasably retaining each of said shielding means in the first position.

13. The device as set forth in claim 10 including means for attaching said securing means to the DSX panel.

14. A protection device for use with a DSX type panel in a telephone switching station for selectively shielding the output jack and the input jack of a circuit while accommodating access to the status light and monitor jack associated with the circuit, said protection device comprising in combination:
(a) means for shielding the output jack and the input jack;
(b) means for relocating said shielding means from a first position to a second position and return to provide access to the output jack and input jack when said shielding means is in the second position; and
(c) means extending from said shielding means for maintaining access to the status light and monitor jack irrespective of whether said shielding means is in the first or second position.

15. The device as set forth in claim 14 including means for securing said shielding means to the DSX panel without impeding relocation of said shielding means from the first to the second position and without impeding relocation of said shielding means from the second to the first position.

16. The device as set forth in claim 15 including means for maintaining said shielding means in the first position.

17. A method for using a protection device in conjunction with a DSX type panel to shield the output jack and input jack of a single circuit while accommodating access to the status light and monitor jack associate with the single circuit, said method comprising the steps of:
(a) shielding the output jack and the input jack;
(b) relocating the protection device from a first position adjacent and parallel to the DSX type panel to a second position not parallel with and laterally displaced from the DSX type panel and from the second position to the first position to provide access to the output jack and the input jack when the protection device is in the second position; and
(c) maintaining access to the status light and monitor jack when the protection device is in the first position and when the protection device is in the second position.

18. The method as set forth in claim 17 including the step of retaining the protection device in the first position.

19. The method as set forth in claim 17 including the step of pivoting the protection device from the first position to the second position and the further step of pivoting the protection device from the second position to the first position.

20. The method as set forth in claim 19 including the step of retaining the protection device in the first position.

* * * * *